US012738197B2

(12) United States Patent
Wang et al.

(10) Patent No.: US 12,738,197 B2
(45) Date of Patent: Sep. 15, 2026

(54) DISPLAY DRIVING DEVICE AND DISPLAY DRIVING METHOD

(71) Applicant: AUO Corporation, Hsin-Chu (TW)

(72) Inventors: Ya-Jung Wang, Hsin-Chu (TW); Yu-Feng Chien, Hsin-Chu (TW); Ting-Wei Guo, Hsin-Chu (TW); Shu-Hao Huang, Hsin-Chu (TW); Min-Hsuan Chiu, Hsin-Chu (TW); Syuan-Ying Lin, Hsin-Chu (TW); Cheng-Kuang Wang, Hsin-Chu (TW); Chen-Yu Chang, Hsin-Chu (TW); Wei-Ming Cheng, Hsin-Chu (TW); Sung-Yu Su, Hsin-Chu (TW)

(73) Assignee: AUO CORPORATION, Hsin-Chu (TW)

(*) Notice: Subject to any disclaimer, the term of this patent is extended or adjusted under 35 U.S.C. 154(b) by 61 days.

(21) Appl. No.: 18/749,682

(22) Filed: Jun. 21, 2024

(65) Prior Publication Data

US 2025/0191522 A1 Jun. 12, 2025

(30) Foreign Application Priority Data

Dec. 12, 2023 (TW) ................................ 112148360

(51) Int. Cl.
*G06F 3/041* (2006.01)
*G09G 3/32* (2016.01)
*G09G 3/3225* (2016.01)

(52) U.S. Cl.
CPC ............. *G09G 3/32* (2013.01); *G06F 3/0412* (2013.01); *G09G 3/3225* (2013.01); *G09G 2300/026* (2013.01)

(58) Field of Classification Search
None
See application file for complete search history.

(56) References Cited

U.S. PATENT DOCUMENTS 11,972,740 B2 * 4/2024 Ma .......................... G09G 3/36
2024/0013746 A1 1/2024 Ma et al.

FOREIGN PATENT DOCUMENTS

CN 102096531 A 6/2011
CN 114882829 A * 8/2022 .......... G06F 3/0416

OTHER PUBLICATIONS

Translation of CN-114882829-A into English; Zeng. (Year: 2022).*

* cited by examiner

*Primary Examiner* — Brian M Butcher
(74) *Attorney, Agent, or Firm* — WPAT, PC

(57) ABSTRACT

A display driving device includes a panel. The panel includes an output region, a first region, a second region, and a third region. The output region is configured to output a detection signal. The first region overlaps the output region, the second region overlaps the output region, and the third region overlaps the output region. During a first period, the second region and the third region output a point report signal according to the detection signal. During a second period, the first region and the third region output the point report signal according to the detection signal. During a third period, the first region and the second region output the point report signal according to the detection signal. The second period is later than the first period and the third period is later than the second period.

18 Claims, 7 Drawing Sheets

DISPLAY DRIVING DEVICE AND DISPLAY DRIVING METHOD

CROSS-REFERENCE TO RELATED APPLICATION

This application claims priority to Taiwan Application Serial Number 112148360, filed Dec. 12, 2023, which is herein incorporated by reference in its entirety.

BACKGROUND

Field of Invention

The present invention relates to a driving device and a driving method. More particularly, the present invention relates to a display driving device and a display driving method.

Description of Related Art

Currently, for the driving of usual panel, the touch electrodes included in a touch panel are easily be interfered by inner signals in the panel and generate the noise, thereby affecting the detection of the touch signal.

Therefore, the display period of the touch panel need to be separated from the period for touch operations.

SUMMARY

This is to provide a simplified summary of the present disclosure; as such the reader may have basic understanding of the present disclosure. The summary is not the complete overview, and it is intended to indicate the important/essential elements or characterize the scope of the disclosure.

An aspect of technique of the present disclosure is associated with a display driving device. The display driving device includes a panel. The panel includes an output region, a first region, a second region, a third region. The output region is configured to output a detection signal. The first region overlaps the output region, the second region overlaps the output region, and wherein the third region overlaps the output region. In a first period, the second region and the third region output a point report signal according the detection signal. In a second period, the first region and the third region output the point report signal according the detection signal. In a third period, the first region and the second region output the point report signal according the detection signal. The second period is later than the first period, and wherein the third period is later than the second period.

The other aspect of technique of the present disclosure is associated with a display driving method. The display driving method includes the following steps. A panel is differentiated into a first region, a second region and a third region. A detection signal is output by an output region. In a first period, a point report signal is output, by the second region and the third region, according to the detection signal. In a second period, the point report signal is output, by the first region and the third region, according to the detection signal. In a third period, the point report signal is output, by the first region and the second region, according to the detection signal.

As a result, according to the technical content of the present disclosure, the display driving device and the display driving method of the present disclosure are able to differentiate the panel into the output region and multiple receiver regions, in order to achieve the affect that the display operation and touch operation are performed at the same time.

After referring to the following embodiments, a person with ordinary knowledge in this technical field can easily understand the basic spirit and other purposes of the invention, as well as the technical means and implementation aspects adopted in the disclosure.

BRIEF DESCRIPTION OF THE DRAWINGS

The present disclosure can be more fully understood by reading the following detailed description of the embodiment, with reference made to the accompanying drawings as follows.

Figure 1A:
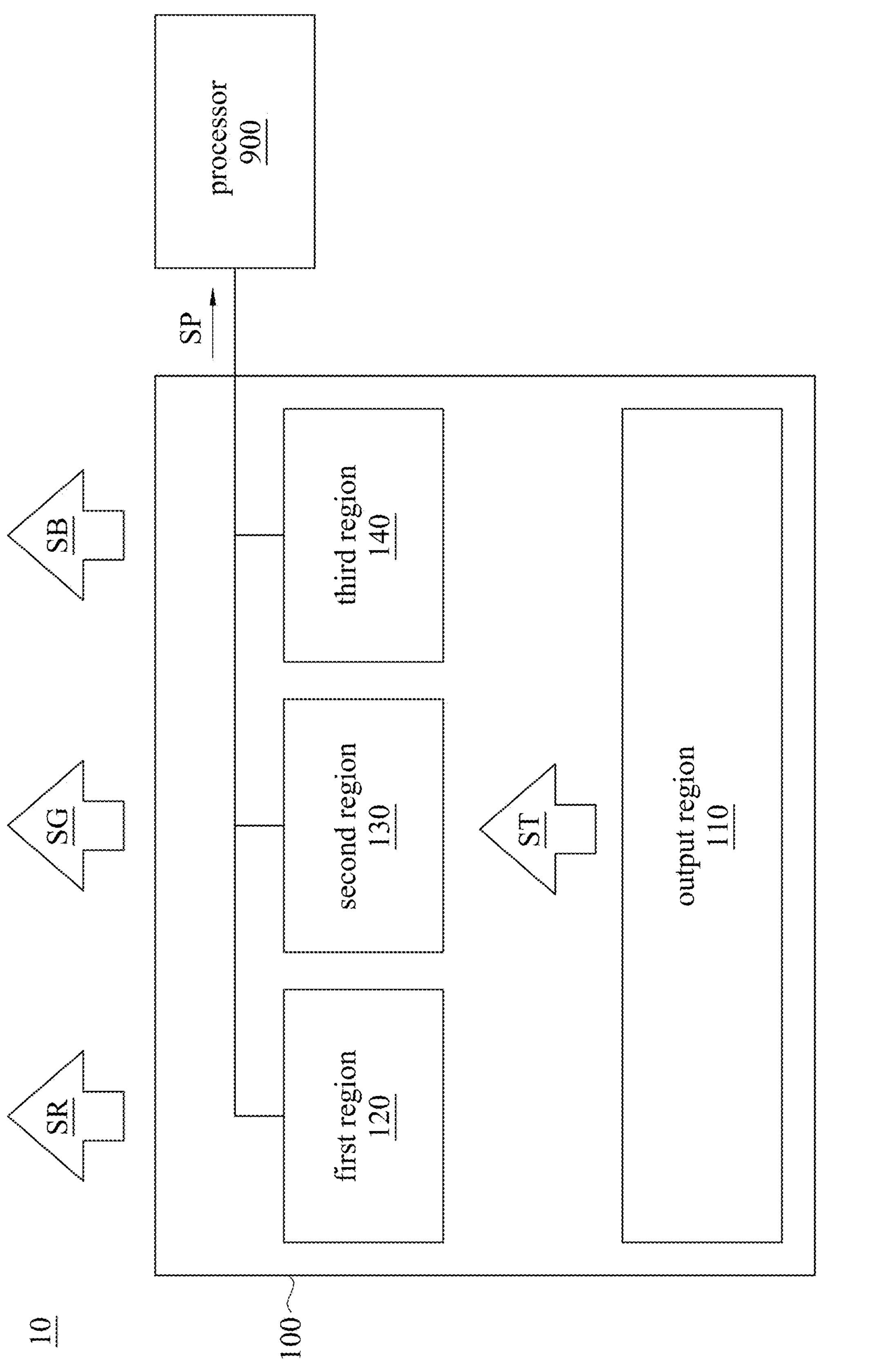
FIG. 1A depicts a block schematic diagram of a display driving device according to one embodiment of the present disclosure.

In accordance with common practice, the various features and components in the drawings are not drawn to scale, but are drawn in such a way as to best present the specific features and components relevant to the disclosure. In addition, the same or similar reference symbols are used to refer to similar elements/components in different drawings.

DETAILED DESCRIPTION

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. Description of the operation does not intend to limit the operation sequence. Any examples resulting in equivalent effects and sequence of steps are within the scope of the present disclosure.

In the description herein and throughout the claims that follow, unless otherwise defined, all terms have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In addition, when there is no conflict with the context, the singular noun recited in the present disclosure covers the plural form of the noun; and the plural form of the noun also covers the singular form of the noun.

In addition, the term of "coupled" or "connect" in the present disclosure can refer to two or more elements are physically or electrically directly connected to each other, or physically or electrically indirectly connected to each other, which can also be refer to mutual operation or action between two or more elements.

In the present disclosure, the term of "region" refers generally to an object consisting of one or more transistors connected to and/or one or more active/passive components in a certain manner to process signals.

Certain words are used in the disclosure and claim scope to refer to specific components. However, those with ordinary skill in the art will understand that the same components may be referred to by different nouns. The way to distinguish components is on a basis of the differences in functions of the components is on a basis of the differences in functions of the components instead of the differences in nouns of the components. The term of "include" is an open-ended terms, which should be refer to "include but not limited to".

FIG. 1A depicts a block schematic diagram of a display driving device according to one embodiment of the present disclosure. As shown in FIG. 1A, in an embodiment, the display driving device 10 includes a panel 100. The panel 100 includes an output region 110, the first region 120, the second region 130 and the third region 140.

For example, the panel 100 can have any types of light emitting diode panel, the any type of light emitting diode can be a micro light emitting diode (Micro LED), a mini light emitting diode (Mini LED) or an organic light emitting diode (Organic LED, OLED), but it is not intended to limit the present disclosure.

In this embodiment, the output region 110 is configured to output a detection signal ST. The first region 120 overlaps the output region 110, the second region 130 overlaps the output region 110, and the third region 140 overlaps output region 110.

For example, the detection signal ST can be an electrical signal, a light signal or an audio signal, the output region 110 can be transmitter electrodes of the touch device (that is, Tx electrode), each of the first region 120, the second region 130 and the third region 140 can have a receiver electrode and light emitting diodes. The first region 120, the second region 130 and the third region 140 can be positioned above the output region 110, and the first region 120, the second region 130 and the third region 140 can be coupled to each other, but which is not intended to limit the present disclosure.

In this embodiment, in a first period, the second region 130 and the third region 140 output a point report signal SP according to the detection signal ST.

Figure 3:
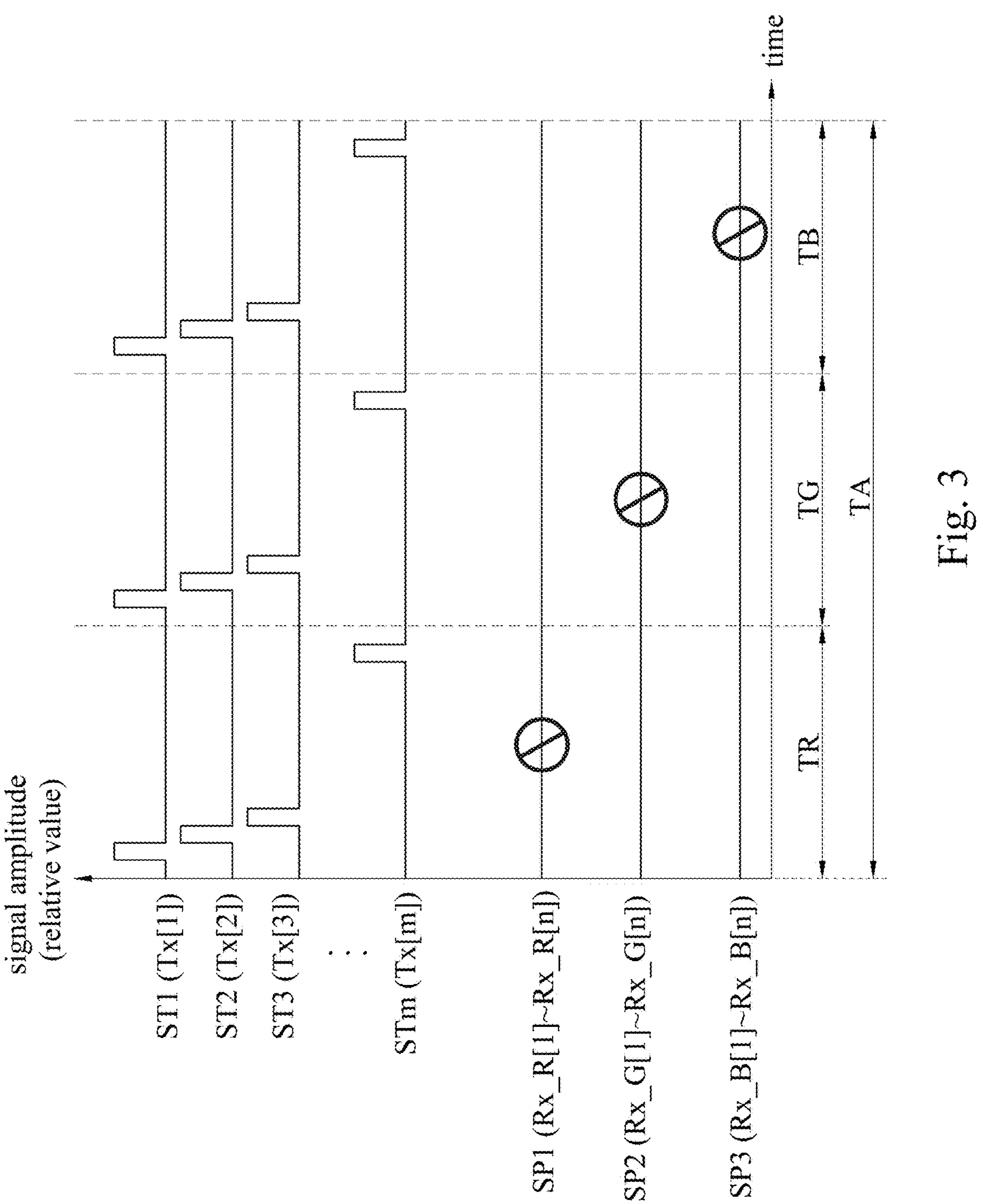
FIG. 3 depicts a timing diagram of multiple signals of a display driving device according to one embodiment of the present disclosure.

For example, in a first period, a user uses finger or an object to touch the panel 100, the second region 130 and the third region 140 receive the detection signal ST which includes the information of the user's finger or the other object, in order to output the point report signal SP, the point report signal SP can be a signal which has information of a position of the user's finger on the panel and/or information of single or multiple fingers, and the first period can correspond to the period TR in the following FIG. 3, but it is not intended to limit the present disclosure.

In this embodiment, in a second period, the first region 120 and the third region 140 output the point report signal SP according to the detection signal ST. In a third period, the first region 120 and the second region 130 outputs the point report signal SP according to the detection signal ST. The second period is later than the first period, and the third period is later than the second period.

For example, in the second period, a user uses finger or an object to touch the panel 100, the first region 120 and the third region 140 receive the detection signal ST which includes the information of the user's finger or the object, in order to output the point report signal SP, and the second period can correspond to the period TG in the following FIG. 3. In third period, a user uses finger or an object to touch the panel 100, the first region 120 and the second region 130 receive the detection signal ST which includes the information of the user's finger or the object, in order to output the point report signal SP, and the third period can correspond to the period TB in the following FIG. 3, but it is not intended to limit the present disclosure.

In some embodiments, the display driving device 10 further includes a processor 900, for coupling relationship; the processor 900 is coupled to the first region 120, the second region 130 and the third region 140.

For example, the processor 900 can receive the point report signal SP from the first region 120, the second region 130 and the third region 140, and the processor 900 can be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), the other processing component or a combination of aforesaid components, but it is not intended to limit the present disclosure.

In some embodiments, the first region 120 and the second region 130 are adjacent to each other, and the second region 130 and the third region 140 are adjacent to each other. In some embodiments, the first region 120 is next to a side of the second region 130, and the third region 140 is next to the other side of the second region 130. In some embodiments, a portion of the first region 120 overlaps a portion of the second region 130, and a portion of the second region 130 overlaps a portion of the third region 140.

In an embodiment, the panel 100 is configured to output the red signal SR, the green signal SG and the blue signal SB in sequence.

For example, the panel 100 can have filed sequential color control techniques, the panel 100 can display red image, green image and blue image in sequence, the red signal SR can be 0~255 gray-level brightness of red light, the green signal SG can be 0~255 gray-level brightness of green light, but it is not intended to limit the present disclosure.

In an embodiment, in the first period, the first region 120 outputs the red signal SR, and the second region 130 and the third region 140 output the point report signal SP according to the detection signal ST.

For example, the first period can correspond to the period TR in the following FIG. 3, the first period can simultaneously be a period that the first region 120 displays a red image and the second region 130 and the third region 140 perform the touch operations, but which is not intended to limit the present disclosure.

In an embodiment, in the second period, the second region 130 outputs the green signal SG, and the first region 120 and the third region 140 output the point report signal SP.

For example, the second period can correspond to the period TG in the flowing FIG. 3, the second period can simultaneously be a period that the second region 130 displays a green image and the first region 120 and the third region 140 perform the touch operations, but which is not intended to limit the present disclosure.

In an embodiment, in the third period, the third region 140 outputs the blue signal SB, and the first region 120 and the second region 130 output the point report signal SP.

For example, the third period can correspond to the period TB in the following FIG. 3, the third period can simultaneously be a period that the third region 140 displays a blue image and the first region 120 and the second region 130 perform the touch operations, but which is not intended to limit the present disclosure.

Figure 1B:
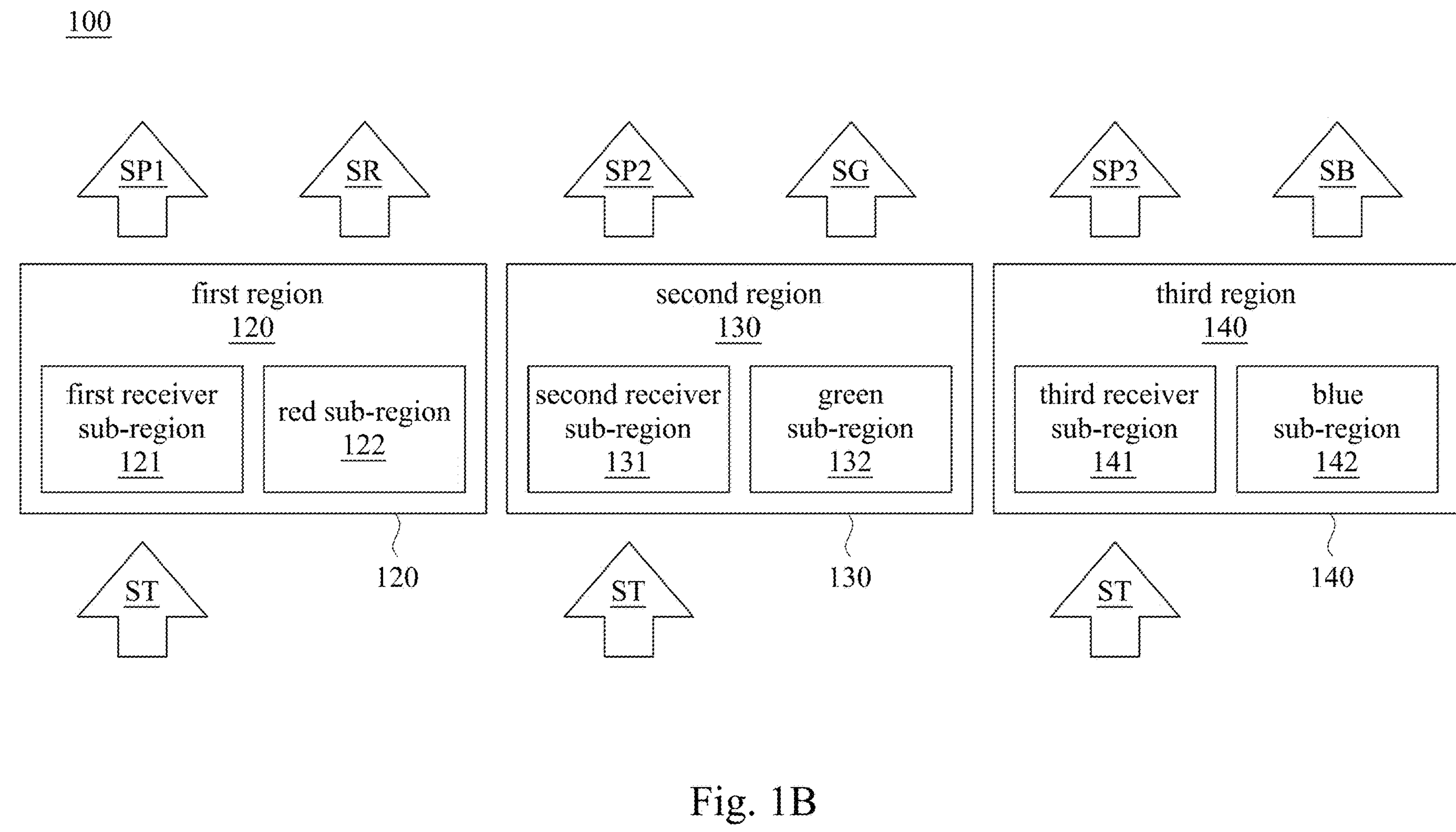
FIG. 1B depicts a block schematic diagram of a display driving device according to one embodiment of the present disclosure.

FIG. 1B depicts a block schematic diagram of a display driving device according to one embodiment of the present disclosure. As shown in FIG. 1B, in an embodiment, the display driving device 10 has a first region 120, a second region 130 and a third region 140. The first region 120 includes a first receiver sub-region 121 and a red sub-region 122. The second region 130 includes a second receiver sub-region 131 and a green sub-region 132. The third region 140 includes a third receiver sub-region 141 and a blue sub-region 142.

For example, each of the first receiver sub-region 121, the second receiver sub-region 131 and the third receiver sub-region 141 can be the receiver electrode of the touch device (that is, the Rx electrode), the red sub-region 122 can be red pixel region, the green sub-region 132 can be green pixel region, and the blue sub-region 142 can be blue pixel region, but which is not intended to limit the present disclosure.

In an embodiment, the first receiver sub-region 121 is configured to receive the detection signal ST and output a first point report subsignal SP1, the second receiver sub-region 131 is configured to receive the detection signal ST and output a second point report subsignal SP2, and the third receiver sub-region 141 is configured to receive the detection signal ST and output the third point report subsignal SP3. The red sub-region 122 is configured to output the red signal SR, the green sub-region 132 is configured to output the green signal SG, and the blue sub-region 142 is configured to output the blue signal SB.

In an embodiment, the first receiver sub-region 121 and the red sub-region 122 are overlapped with each other. In the first period, the red sub-region 122 outputs the red signal SR.

For example, the first receiver sub-region 121 can be positioned above the red sub-region 122, the first period can correspond to the period TR in the following FIG. 3, in the period TR, the red sub-region 122 can output the red image, but it is not intended to limit the present disclosure.

In an embodiment, the second receiver sub-region 131 and the green sub-region 132 are overlapped with each other. In the second period, the green sub-region 132 outputs the green signal SG.

For example, the second receiver sub-region 131 can be positioned above the green sub-region 132, the second period can correspond to the period TG in the following FIG. 3, in the period TG, the green sub-region 132 can output the green image, but it is not intended to limit the present disclosure.

In an embodiment, the third receiver sub-region 141 and the blue sub-region 142 are overlapped with each other. In the third period, the blue sub-region 142 outputs the blue signal SB.

For example, the third receiver sub-region 141 can be positioned above the blue sub-region 142, the third period can correspond to the period TB in the following FIG. 3, in the period TB, the blue sub-region 142 can output the blue image, but which is not intended to limit the present disclosure.

In an embodiment, the point report signal SP includes at least one of a first point report subsignal SP1, a second point report subsignal SP2 and a third point report subsignal SP3.

For example, the first point report subsignal SP1, the second point report subsignal SP2 and/or the third point report subsignal SP3 can constitute the point report signal SP, but it is not intended to limit the present disclosure.

And, the point report signal SP, the first point report subsignal SP1, the second point report subsignal SP2 or the third point report subsignal SP3 can be an electrical signal, such as, a pulse signal or a constant electrical signal, but it is not intended to limit the present disclosure.

In this embodiment, in the first period, the second receiver sub-region 131 outputs the second point report subsignal SP2 according to the detection signal ST, and the third receiver sub-region 141 outputs the third point report subsignal SP3 according to the detection signal ST.

For example, the first period can correspond to the period TR in the following FIG. 3, in the first period, the user uses finger or object to touch the panel 100, the second receiver sub-region 131 receives the detection signal ST which includes information of the user's finger or the other object to output the second point report subsignal SP2, and the third receiver sub-region 141 receives the detection signal ST which includes information of the user's finger or the other object to output the third point report subsignal SP3, but it is not intended to limit the present disclosure.

In an embodiment, in the second period, the first receiver sub-region 121 outputs the first point report subsignal SP1 according to the detection signal ST, and the third receiver sub-region 141 outputs the third point report subsignal SP3 according to the detection signal ST.

For example, the second period can correspond to the period TG in the following FIG. 3, in the second period, the user uses the finger or the object to touch the panel 100, the first receiver sub-region 121 receives the detection signal ST which includes information of the user's finger or the other object to output the first point report subsignal SP1, and the third receiver sub-region 141 receives the detection signal ST which includes information of the user's finger or the other object to output the third point report subsignal SP3, but it is not intended to limit the present disclosure.

In an embodiment, in the third period, the first receiver sub-region outputs the first point report subsignal SP1 according to the detection signal ST, and the second receiver sub-region 131 outputs the second point report subsignal SP2 according to the detection signal ST.

For example, the third period can correspond to the period TB in the following FIG. 3, in the third period, the user uses the finger or the object to touch the panel 100, the first receiver sub-region 121 receives the detection signal ST which includes information of the user's finger or the other object to output the first point report subsignal SP1, and the second receiver sub-region 131 receives the detection signal ST which includes information of the user's finger or the other object to output the second point report subsignal SP2, but it is not intended to limit the present disclosure.

Figure 2:
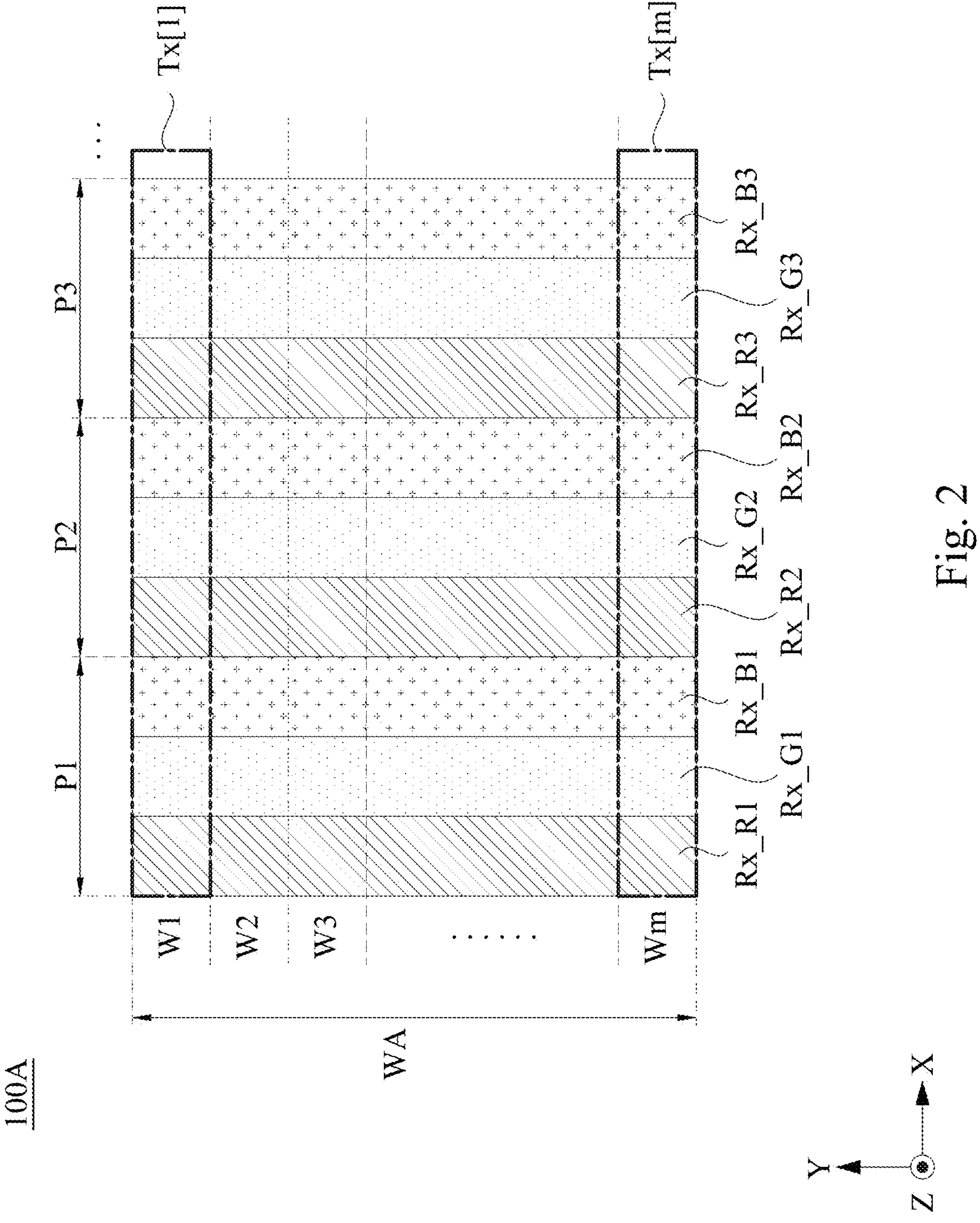
FIG. 2 depicts a structure diagram of a display driving device according to one embodiment of the present disclosure.

FIG. 2 depicts a structure diagram of a display driving device according to one embodiment of the present disclosure. A shown in FIG. 2, in some embodiments, the panel 100A has a receiver electrode Rx_R1, a receiver electrode Rx_G1, a receiver electrode Rx_B1, a receiver electrode Rx_R2, a receiver electrode Rx_G2, a receiver electrode Rx_B2, a receiver electrode Rx_R3, a receiver electrode Rx_G3, a receiver electrode Rx_B3 and transmitter electrodes Tx[1]~Tx[m].

For example, each of the receiver electrode Rx_R1, the receiver electrode Rx_G1 and the receiver electrode Rx_B1 can has n receiver electrodes arranged along the X axis direction, the receiver electrode Rx_R1, the receiver electrode Rx_G1, the receiver electrode Rx_B1, the receiver electrode Rx_R2, the receiver electrode Rx_G2, the receiver electrode Rx_B2, the receiver electrode Rx_R3, the receiver electrode Rx_G3 and/or the receiver electrode Rx_B3 can extend along the Y axis direction. The transmitter electrodes Tx[1]~Tx[m] can extend along the X axis direction and can have m transmitter electrodes, the said "m" and "n" can be positive integer larger than or equal to 0, but it is not intended to limit the present disclosure.

In some embodiments, the receiver electrode Rx_R1, the receiver electrode Rx_R2 and the receiver electrode Rx_R3 in FIG. 2 can correspond to the first receiver sub-region 121 in FIG. 1B, and the receiver electrode Rx_G1, the receiver electrode Rx_G2 and the receiver electrode Rx_G3 can correspond to the second receiver sub-region 131 in FIG. 1B. The receiver electrode Rx_B1, the receiver electrode Rx_B2 and the receiver electrode Rx_B3 can correspond to the third receiver sub-region 141 in FIG. 1B, but it is not intended to limit the present disclosure.

In some embodiments, the transmitter electrodes Tx[1]~Tx[m] in FIG. 2 can correspond to the output region 110 in FIG. 1A, the receiver electrode Rx_R1, and the receiver electrode Rx_R2 and the receiver electrode Rx_R3 can correspond to the first region 120 in FIG. 1A. The receiver electrode Rx_G1, the receiver electrode Rx_G2 and the receiver electrode Rx_G3 can correspond to the second region 130 in FIG. 1A, and the receiver electrode Rx_B1, the receiver electrode Rx_B2 and the receiver electrode Rx_B3 can correspond to the third region 140 in FIG. 1A, but it is not intended to limit the present disclosure.

In some embodiments, there are red pixels below the receiver electrode Rx_R1, there are green pixels below the receiver electrode Rx_G1, and there are blue pixels below the receiver electrode Rx_B1. There are red pixels below the receiver electrode Rx_R2, there are green pixels below the receiver electrode Rx_G2, and there are blue pixels below the receiver electrode Rx_B2. There are red pixels below the receiver electrode Rx_R3, there are green pixels below the receiver electrode Rx_G3, and there are blue pixels below the receiver electrode Rx_B3, but it is not intended to limit the present disclosure.

In some embodiments, the receiver electrode Rx_R1, the receiver electrode Rx_G1, the receiver electrode Rx_B1, the receiver electrode Rx_R2, the receiver electrode Rx_G2, the receiver electrode Rx_B2, the receiver electrode Rx_R3, the receiver electrode Rx_G3 and the receiver electrode Rx_B3 have the same electrode width and the same electrode length.

For example, the receiver electrode Rx_R1, the receiver electrode Rx_G1, the receiver electrode Rx_B1, the receiver electrode Rx_R2, the receiver electrode Rx_G2, the receiver electrode Rx_B2, the receiver electrode Rx_R3, the receiver electrode Rx_G3 and the receiver electrode Rx_B3 can have the same electrode width, the said electrode width can be $$\frac{1}{3} \times \text{length } P1,\ \frac{1}{3} \times \text{length } P2 \text{ or } \frac{1}{3} \times \text{length } P3,$$

and the length P1, the length P2 and the length P3 are the same to each other, but it is not intended to limit the present disclosure.

And, the receiver electrode Rx_R1, the receiver electrode Rx_G1, the receiver electrode Rx_B1, the receiver electrode Rx_R2, the receiver electrode Rx_G2, the receiver electrode Rx_B2, the receiver electrode Rx_R3, the receiver electrode Rx_G3 and the receiver electrode Rx_B3 can have the same electrode length, the said electrode length can be the length WA, and the length WA can be a sum of the length W1 to the length Wm, but it is not intended to limit the present disclosure.

In some embodiments, the transmitter electrodes Tx[1]~Tx[m] can have the same electrode width.

For example, the transmitter electrodes Tx[1]~Tx[m] can have the same electrode width, the electrode width can be the length W1, the length W2, the length W3 or the length Wm, and the lengths of the length W1, the length W2, the length W3 and the length Wm are the same to each other, but it is not intended to limit the present disclosure.

FIG. 3 depicts a timing diagram of multiple signals of a display driving device according to one embodiment of the present disclosure. As shown in FIG. 3, in some embodiments, FIG. 3 depicts detection signals ST1~STm, a first point report subsignal SP1, a second point report subsignal SP2, a third point report subsignal SP3, a period TA, a period TR, a the period TG and the period TB.

In some embodiments, the period TA includes a period TR, a period TG and the period TB. In the period TR, each of the detection signal ST1, the detection signal ST2, the detection signals ST3~STm has a pulse signal. In the period TG, each of the detection signal ST1, the detection signal ST2, the detection signals ST3~STm has a pulse signal. In the period TB, each of the detection signal ST1, the detection signal ST2, the detection signals ST3~STm has a pulse signal.

And, each of the detection signals ST1~STm in FIG. 3 can correspond to the signals output by the transmitter electrodes Tx[1]~Tx[m] in FIG. 2. The period TG can be later than the period TR, the period TB can be later than the period TG, but it is not intended to limit the present disclosure.

In some embodiments, in the period TR, each of the second point report subsignal SP2 and the third point report subsignal SP3 has a constant electrical signal. In the period TG, each of the first point report subsignal SP1 and the third point report subsignal SP3 has a constant electrical signal. In the period TB, each of the first point report subsignal SP1 and the third point report subsignal SP2 has a constant electrical signal.

For example, each of the first point report subsignal SP1, the second point report subsignal SP2 and the third point report subsignal SP3 in FIG. 3 can correspond to the signals output by the first receiver sub-region 121, the second receiver sub-region 131 and the third receiver sub-region 141 in FIG. 1B. A constant voltage value of the first point report subsignal SP1 can be about 3 volts, a constant voltage value of the second point report subsignal SP2 can be about 3 volts, and a constant voltage value of the third point report subsignal SP3 can be about 3 volts, but it is not intended to limit the present disclosure.

Reference is also made to FIG. 1A, 1B and FIG. 3, in an embodiment, a first time length of the first period is the same as a second time length of the second period. The second time length of the second period is the same as a third time length of the third time length of the third period.

For example, the first period can be the period TR in FIG. 3, the second period can be the period TG in FIG. 3, and the third period can be the period TB in FIG. 3. The first time length of the period TR is the same as a second time length of the period TG. The second time length of second period TG is the same as a third time length of the third time length of the period TB. And, each of the first time length, the second time length and the third time length can be a period of one frame of the panel 100, but it is not intended to limit the present disclosure.

In this embodiment, the first time length, the second time length and the third time length are associated to the screen refresh time of the panel 100.

For example, the screen refresh rate of the panel 100 can be 60 Hz, the screen refresh time of the panel 100 can be, such as, 1/60 s, but it is not intended to limit the present disclosure.

In some embodiments, the processor 900 can set the voltage level threshold on at least one of the point report signal SP, the first point report subsignal SP1, the second point report subsignal SP2 and the third point report subsignal SP3.

For example, the processor 900 can have the voltage level threshold, such as, voltage level of 1 volt. When the voltage value of one of the point report signal SP, the first point report subsignal SP1, the second point report subsignal SP2 and third point report subsignal SP3 is greater than or less than the aforesaid voltage level threshold, the one of the detection signal SP, the first point report subsignal SP1, the second point report subsignal SP2 and third point report subsignal SP3 can be ignored.

Further, in the case that the voltage value is less than the aforesaid voltage level threshold which can be ignored, in the period TR, the voltage value of the first point report subsignal SP1 can be 0.5 volts, the voltage value of the second point report subsignal SP2 can be 3 volts and the voltage value of the third point report subsignal SP3 can be 3 volts. Since the voltage of the first point report subsignal SP1 is less than the voltage level threshold set by the processor 900, the first point report subsignal SP1 can be ignored, but it is not intended to limit the present disclosure.

And, in the case that the voltage value is greater than the aforesaid voltage level threshold which can be ignored, in the period TR, the first point report subsignal SP1 can be 3 volts, the voltage value of the second point report subsignal SP2 can be 0.5 volts and the voltage value of the third point report subsignal SP3 can be 0.5 volts. Since the voltage of the first point report subsignal SP1 is greater than the voltage level threshold set by the processor 900, the first point report subsignal SP1 can be ignored, but it is not intended to limit the present disclosure.

Furthermore, the determination manner for one of the first point report subsignal SP1, the second point report subsignal SP2 and the third point report subsignal SP3 is similar with the determination manner based on the voltage level threshold, the description is omitted here to simplify the content of the disclosure.

In some embodiments, for the usual techniques, the touch electrodes of the touch panel (such as, Rx electrode) are easily to be interfered by the inner signals of the panel (such as, the signals of the data lines) and generate the noise. To avoid the noise effect the detection signals detected by the touch electrodes, the period of the display operation needed to be completely separated from the period of the touch operation.

As mentioned above, compare to the abovementioned usual techniques about detection signals detected by the touch electrodes, the display driving method of the present disclosure can achieve that the period of the display operation can overlap the period of the touch period, such as, within a specified period of time, the panel can simultaneously perform the display operation and the touch operation, but it is not intended to limit the present disclosure.

Figure 4:
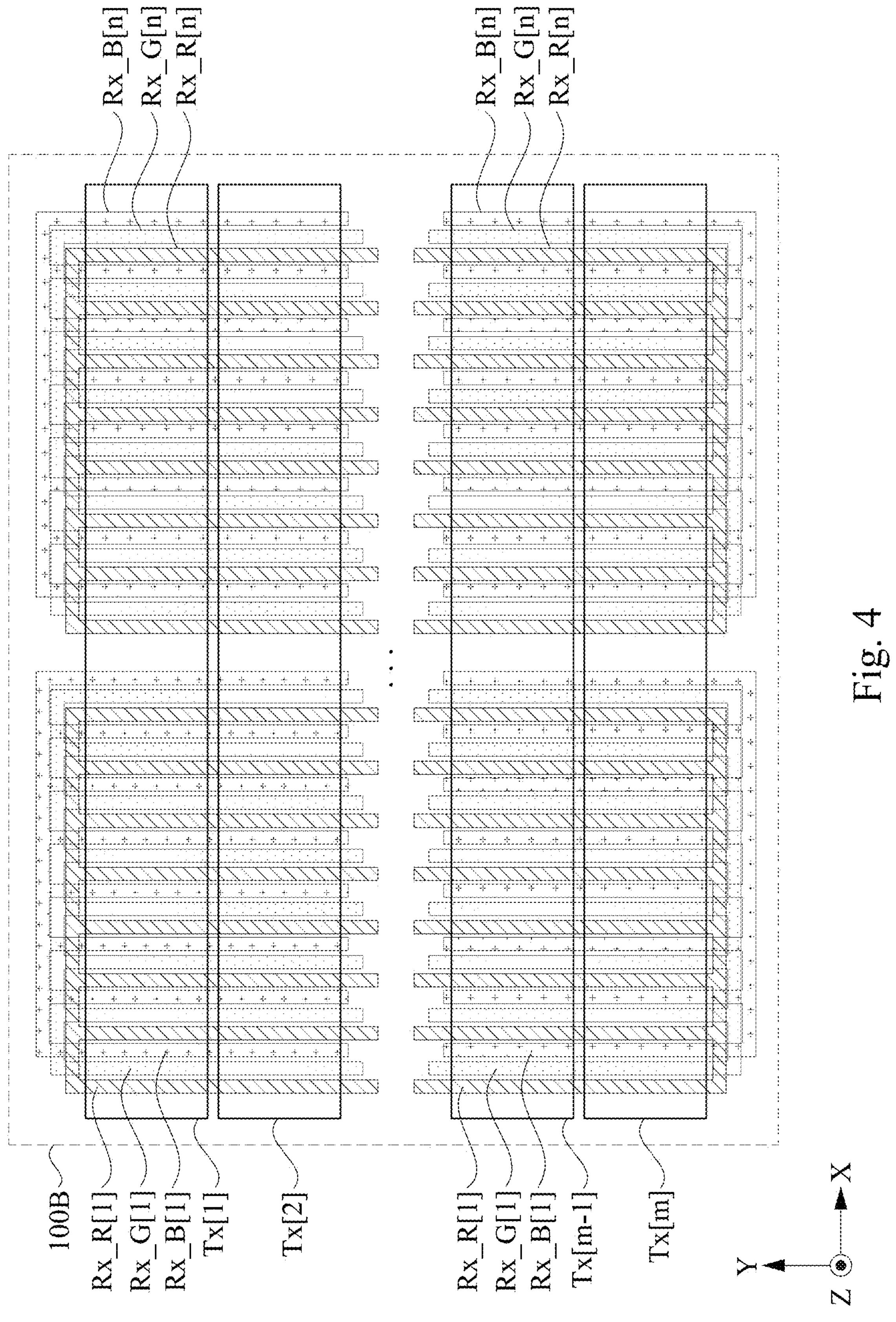
FIG. 4 depicts a structure diagram of a display driving device according to one embodiment of the present disclosure.

FIG. 4 depicts a structure diagram of a display driving device according to one embodiment of the present disclosure. As shown in FIG. 4, in some embodiments, the panel 1001B includes n groups of the receiver electrodes and m groups of the transmitter electrodes. The n groups of the receiver electrodes includes n receiver electrodes Rx_R[1]~Rx_R[n], n receiver electrodes Rx_G[1]~Rx_G[n] and n receiver electrodes Rx_B[1]~Rx_B[n]. The m groups of the transmitter electrodes includes the transmitter electrode Tx[1] and the transmitter electrodes Tx[2]~Tx[m].

For example, each of the receiver electrode Rx_R[1], the receiver electrode Rx_G[1] and the receiver electrode Rx_B[1] can be an electrode structure in comb shape. Each of the n receiver electrodes Rx_R[1]~Rx_R[n], the n receiver electrodes Rx_G[1]~Rx_G[n] and the n receiver electrode Rx_B[1]~Rx_B[n] can extend along Y axis direction, and each of the transmitter electrode Tx[1], the transmitter electrodes Tx[2]~Tx[m] can extend along X axis direction, but it is not intended to limit the present disclosure.

In some embodiments, the panel 100B in FIG. 4 can correspond to the panel 100 in FIG. 1A. The receiver electrode Rx_R[1] in FIG. 4 can correspond to the first region 120 in FIG. 1A. The receiver electrode Rx_G[1] in FIG. 4 can correspond to the second region 130 in FIG. 1A. The receiver electrode Rx_B[1] in FIG. 4 can correspond to the third region 140 in FIG. 1A. The transmitter electrode Tx[1] in FIG. 4 can correspond to the output region 110 in FIG. 1A, but it is not intended to limit the present disclosure.

In some embodiments, n receiver electrodes Rx_R[1]~Rx_R[n] in FIG. 4 can correspond to the first region 120 in FIG. 1A. The receiver electrodes Rx_G[1]~Rx_G[n] in FIG. 4 can correspond to the second region 130 in FIG. 1A. The receiver electrodes Rx_B[1]~Rx_B[n] in FIG. 4 can correspond to the third region 140 in FIG. 1A. The transmitter electrodes Tx[1]~Tx[m] in FIG. 4 can correspond to the output region 110 in FIG. 1A, but it is not intended to limit the present disclosure.

In some embodiments, the panel 100B in FIG. 4 can correspond to the panel 100 in FIG. 1B. The receiver electrode Rx_R[1] in FIG. 4 can correspond to the first receiver sub-region 121 in FIG. 1B. The receiver electrode Rx_G[1] in FIG. 4 can correspond to the second receiver sub-region 131 in FIG. 1B. The receiver electrode Rx_B[1] in FIG. 4 can correspond to the third receiver sub-region 141 in FIG. 1B, but it is not intended to limit the present disclosure.

In some embodiments, n receiver electrodes Rx_R[1]~Rx_R[n] in FIG. 4 can correspond to the first receiver sub-region 121 in FIG. 1B. The n receiver electrodes Rx_G[1]~Rx_G[n] can correspond to the second receiver sub-region 131 in FIG. 1B. The n receiver electrodes Rx_B[1]~Rx_B[n] can correspond to the third receiver sub-region 141 in FIG. 1B, but it is not intended to limit the present disclosure.

In some embodiments, the panel 100B in FIG. 4 can correspond to the panel 100A in FIG. 2. The receiver electrode Rx_R[1] in FIG. 4 can correspond to the receiver electrode Rx_R1, the receiver electrode Rx_R2 and the receiver electrode Rx_R3 in FIG. 2. The receiver electrode Rx_G[1] in FIG. 4 can correspond to the receiver electrode Rx_G1, the receiver electrode Rx_G2 and the receiver electrode Rx_G3 in FIG. 2. The receiver electrode Rx_B[1] in FIG. 4 can correspond to the receiver electrode Rx_B1, the receiver electrode Rx_B2 and the receiver electrode Rx_B3 in FIG. 2, but it is not intended to limit the present disclosure.

In some embodiments, the part where the receiver electrode Rx_R[1], the receiver electrode Rx_G[1] and the receiver electrode Rx_B[1] overlap the transmitter electrode Tx[1] can have a×b groups of pixels.

For example, one electrode group (such as, the receiver electrode Rx_R[1], the receiver electrode Rx_G[1], the receiver electrode Rx_B[1] and the transmitter electrode Tx[1]) can have a×b groups of pixels, such as, 1920×1080, 800×600 pixels. etc., but it is not intended to limit the present disclosure.

Figure 5:
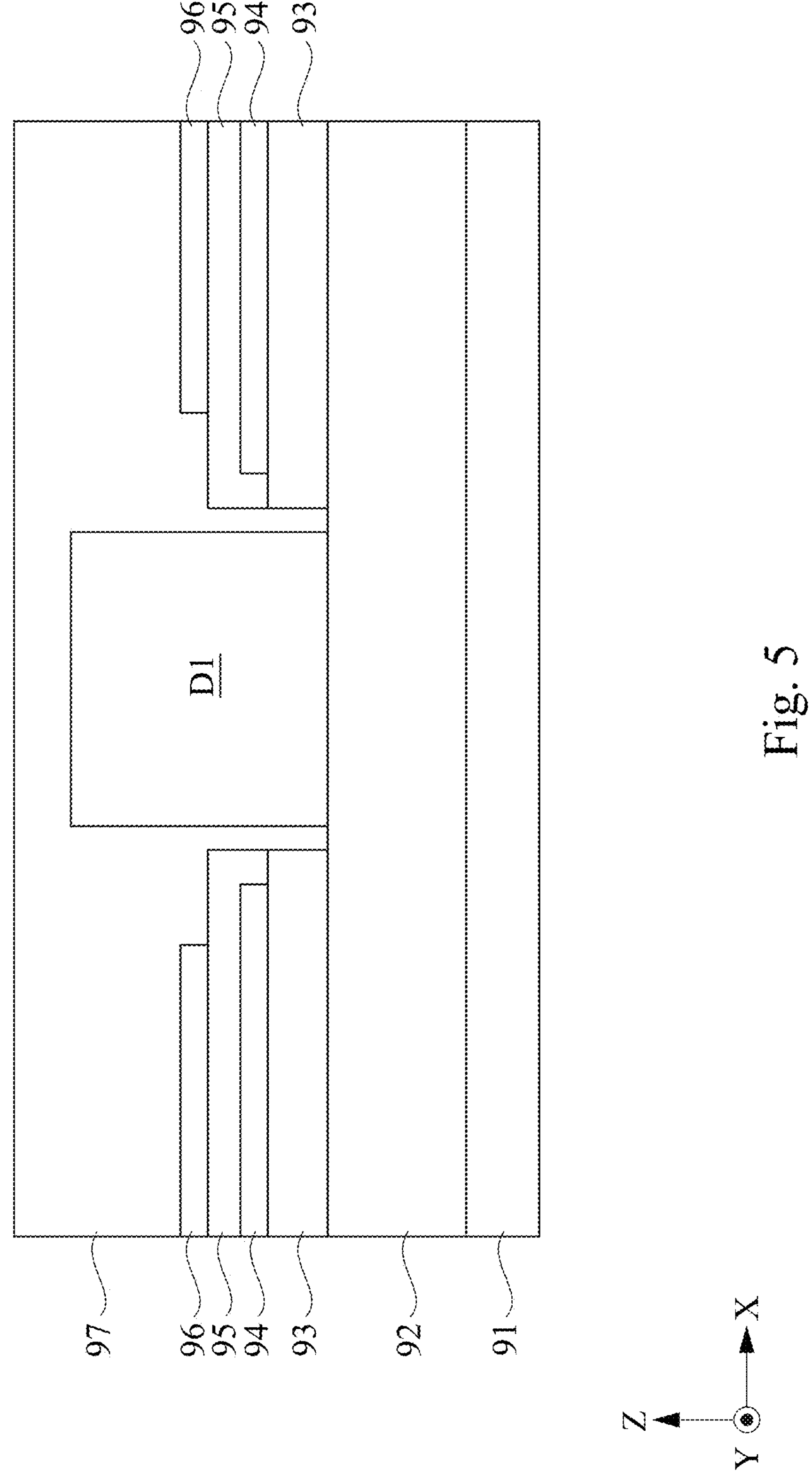
FIG. 5 depicts a structure diagram of a display driving device according to one embodiment of the present disclosure.

FIG. 5 depicts a structure diagram of a display driving device according to one embodiment of the present disclosure. As shown in FIG. 5, in some embodiments, the panel 90 includes a substrate 91, a pixel circuit 92, an isolation layer 93, a transmitter electrode 94, an isolation layer 95, a receiver electrode 96, a protection layer 97 and a light emitting diode D1.

For example, the substrate 91 can be a silicon substrate, a silicon carbide (SiC) substrate or a glass substrate, etc., the pixel circuit 92 can be a pixel and/or a driving circuit of the pixel. The isolation layer 93, the isolation layer 95 and the protection layer 97 can be isolation layers which can be buried oxide (BOX) layers, silicone layers, carbon-doped silicon oxide or the similar one. The light emitting diode D1 can be any types of the light emitting diode, such as, a micro light emitting diode (Micro LED), a mini light emitting diode (Mini LED), or an organic light emitting diode (Organic LED, OLED), but it is not intended to limit the present disclosure.

And, the transmitter electrode 94 can be any types of the transmitter electrode (that is, Tx electrode), and the receiver electrode 96 can be any types of the receiver electrode (that is, Rx electrode), but it is not intended to limit the present disclosure.

In some embodiments, the transmitter electrode 94 in FIG. 5 can correspond to the output region 110 in FIG. 1A, and the receiver electrode 96 in FIG. 5 can correspond to the first receiver sub-region 121, the second receiver sub-region 131 and/or the third receiver sub-region 141 in FIG. 1B, but it is not intended to limit the present disclosure.

In some embodiments, the panel 90 includes a substrate 91, a pixel circuit 92, a transmitter electrode 94, an isolation layer 95, a receiver electrode 96, a protection layer 97 and a light emitting diode D1.

For example, the isolation layer 93 of the panel 90 can be ignored, but it is not intended to limit the present disclosure.

In some embodiments, the panel 90 of FIG. 5 can be a partial side view of the panel 100B in FIG. 4.

For example, a part where one of the receiver electrode Rx_R[1], the receiver electrode Rx_G[1] and the receiver electrode Rx_B[1] overlaps the transmitter electrode Tx[1] can be shown in FIG. 5, but it is not intended to limit the present disclosure.

In some embodiments, the display driving device 10 of the present disclosure can be used in the touch panel, such as, an on-cell touch panel (oTP) or an in-cell touch panel (iTP), but it is not intended to limit the present disclosure.

In some embodiments, each of the “region” and “sub-region” in the present disclosure can be considered as “circuit”, “component” or “device”, but it is not intended to limit the present disclosure.

Figure 6:
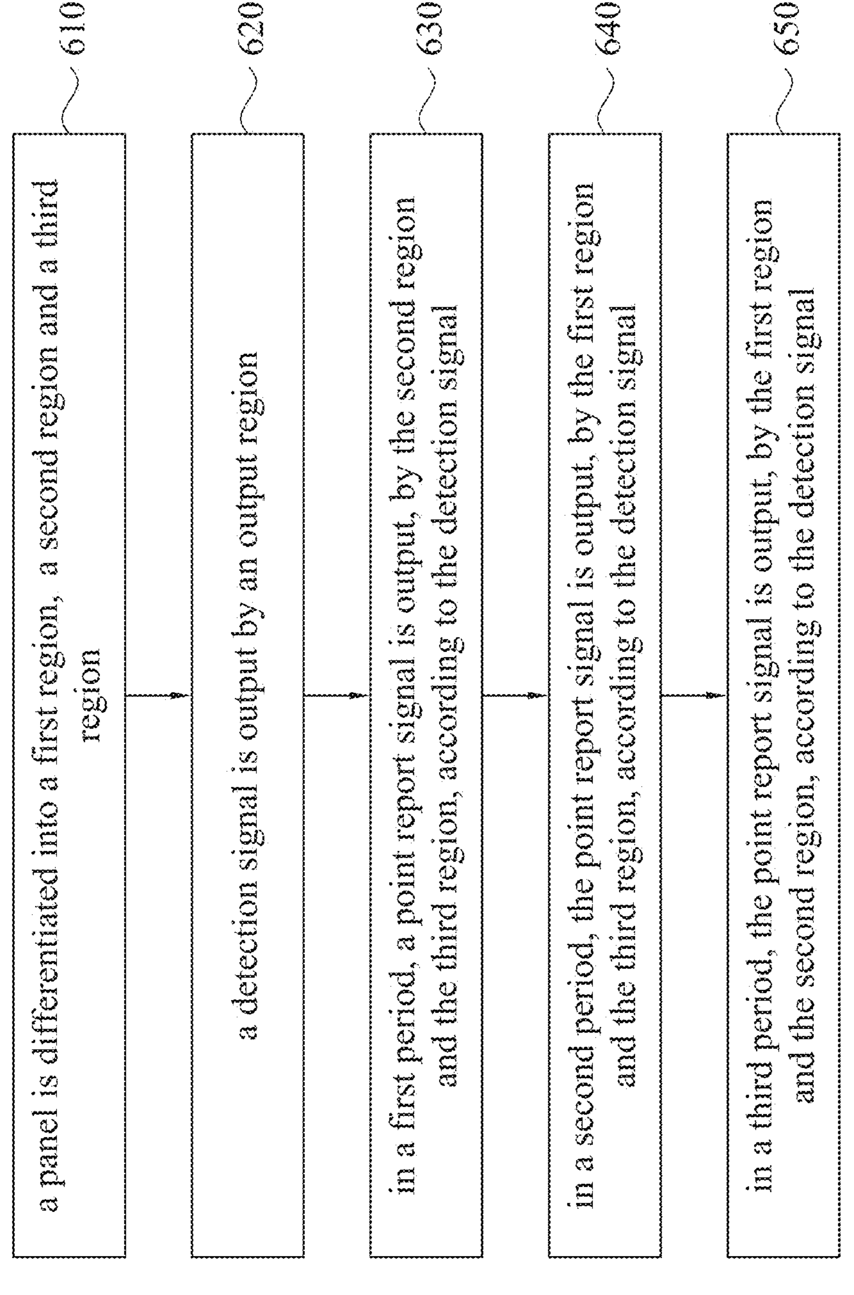
FIG. 6 depicts a flowchart of steps of a display driving method according to one embodiment of the present disclosure.

FIG. 6 depicts a flowchart of steps of a display driving method according to one embodiment of the present disclosure. As shown in FIG. 6, in an embodiment, the display driving method 600 includes multiple steps 610~650, the operations about the multiple steps 610~650 are described in detailed in the following description.

In step S610, a panel is differentiated into a first region, a second region and a third region.

Reference is also made to FIG. 1A and FIG. 6, in an embodiment, the panel 100 includes an output region 110, a first region 120, a second region 130 and a third region 140. For example, the operation of the display driving method 600 is similar to the operation of the display driving device 10 in FIG. 1A, and the description of the other operation of the display driving method 600 is omitted here to simplify the content of the disclosure.

In step 620, a detection signal is output by an output region.

Reference is also made to FIG. 1A and FIG. 6, in an embodiment, the output region 110 is configured to output the detection signal ST. For example, the operation of the display driving method 600 is similar to the operation of the display driving device 10 in FIG. 1A, and the description of the other operation of the display driving method 600 is omitted here to simplify the content of the disclosure.

In step 630, in a first period, a point report signal is output, by the second region and the third region, according to the detection signal.

Reference is also made to FIG. 1A and FIG. 6, in an embodiment, in the first period, the second region 130 and the third region 140 output the point report signal SP according to the detection signal ST. For example, the operation of the display driving method 600 is similar to the operation of the display driving device 10 in FIG. 1A, and the description of the other operation of the display driving method 600 is omitted here to simplify the content of the disclosure.

In step S640, in a second period, the point report signal is output, by the first region and the third region, according to the detection signal.

Reference is also made to FIG. 1A and FIG. 6, in an embodiment, in the second period, the first region 120 and the third region 140 output the point report signal SP according to the detection signal ST. For example, the operation of the display driving method 600 is similar to the operation of the display driving device 10 in FIG. 1A, and the description of the other operation of the display driving method 600 is omitted here to simplify the content of the disclosure.

In step S650, in a third period, the point report signal is output, by the first region and the second region, according to the detection signal.

Reference is also made to FIG. 1A and FIG. 6, in an embodiment, in the third period, the first region 120 and the second region 130 output the point report signal SP according to the detection signal ST. The second period is later than the first period, and the third period is later than the second period. For example, the operation of the display driving method 600 is similar to the operation of the display driving device 10 in FIG. 1A, and the description of the other operation of the display driving method 600 is omitted here to simplify the content of the disclosure.

In an embodiment, the display driving method 600 further includes the following steps. The red signal SR, the green signal SG and the blue signal SB are output by the panel 100 in sequence; and in the first period, the red signal SR is output by the first region 120, and the point report signal SP is output by the second region 130 and the third region 140 according to the detection signal ST. In this embodiment, the first region 120 overlaps the output region 110, the second region 130 overlaps the output region 110, and the third region 140 overlaps the output region 110. For example, the operation of the display driving method 600 is similar to the operation of the display driving device 10 in FIG. 1A, and the description of the other operation of the display driving method 600 is omitted here to simplify the content of the disclosure.

In an embodiment, the display driving method 600 further includes the following steps. In the second period, the green signal SG is output by the second region 130, and the point report signal SP is output by the first region 120 and third region 140; and in the third period, the blue signal SB is output by the third region 140, and the point report signal SP is output by the first region 120 and the second region 130. For example, the operation of the display driving method 600 is similar to the operation of the display driving device 10 in FIG. 1A, and the description of the other operation of the display driving method 600 is omitted here to simplify the content of the disclosure.

Reference is also made to FIG. 1A, FIG. 1B and FIG. 6, in an embodiment, the display driving method 600 further includes the following steps. The first region 120 is differentiated into the first receiver sub-region 121 and the red sub-region 122; and in the first period, the red signal SR is output by the red sub-region 122. In this embodiment, the first receiver sub-region 121 and the red sub-region 122 are overlapped with each other. For example, the operation of the display driving method 600 is similar to the operation of the display driving device 10 in FIG. 1A, and the description of the other operation of the display driving method 600 is omitted here to simplify the content of the disclosure.

In an embodiment, the display driving method 600 further includes the following steps. The second region 130 is differentiated into the second receiver sub-region 131 and the green sub-region 132; and in the second period, the green signal SG is output by the green sub-region 132. In this embodiment, the second receiver sub-region 131 and the green sub-region 132 are overlapped with each other. For example, the operation of the display driving method 600 is similar to the operation of the display driving device 10 in FIG. 1A, and the description of the other operation of the display driving method 600 is omitted here to simplify the content of the disclosure.

In an embodiment, the display driving method 600 further includes the following steps. The third region 140 is differentiated into the third receiver sub-region 141 and the blue sub-region 142; and in the third period, the blue signal SB is output by the blue sub-region 142. In this embodiment, the third receiver sub-region 141 and the blue sub-region 142 are overlapped with each other. In this embodiment, the point report signal SP includes at least one of the first point report subsignal SP1, the second point report subsignal SP2 and the third point report subsignal SP3. For example, the operation of the display driving method 600 is similar to the operation of the display driving device 10 in FIG. 1A, and the description of the other operation of the display driving method 600 is omitted here to simplify the content of the disclosure.

In an embodiment, the display driving method 600 further includes the following steps. In the first period, the second point report subsignal SP2 is output by the second receiver sub-region 131 according to the detection signal ST, and the third point report subsignal SP3 is output by the third receiver sub-region 141 according to the detection signal ST. For example, the operation of the display driving method 600 is similar to the operation of the display driving device 10 in FIG. 1A, and the description of the other operation of the display driving method 600 is omitted here to simplify the content of the disclosure.

In an embodiment, the display driving method 600 further includes the following steps. In the second period, the first point report subsignal SP1 is output by the first receiver sub-region 121 according to the detection signal ST, and the third point report subsignal SP3 is output by the third receiver sub-region 141 according to the detection signal ST. For example, the operation of the display driving method 600 is similar to the operation of the display driving device 10 in FIG. 1A, and the description of the other operation of the display driving method 600 is omitted here to simplify the content of the disclosure.

In an embodiment, the display driving method 600 further includes the following steps. In the third period, the first point report subsignal SP1 is output by the first receiver sub-region according to the detection signal ST, and the second point report subsignal SP2 is output by the second receiver sub-region 131 according to the detection signal ST. For example, the operation of the display driving method 600 is similar to the operation of the display driving device 10 in FIG. 1A, and the description of the other operation of the display driving method 600 is omitted here to simplify the content of the disclosure.

Reference is also made to FIG. 1A, FIG. 2 and FIG. 6, in some embodiments, the panel 100A has a receiver electrode Rx_R1, a receiver electrode Rx_G1, a receiver electrode Rx_B1, a the receiver electrode Rx_R2, a the receiver electrode Rx_G2, a the receiver electrode Rx_B2, a receiver electrode Rx_R3, a the receiver electrode Rx_G3, a receiver electrode Rx_B3 and the transmitter electrodes Tx[1]~Tx[m]. For example, the operation of the display driving method 600 is similar to the operation of the display driving device 10 in FIG. 1A, and the description of the other operation of the display driving method 600 is omitted here to simplify the content of the disclosure.

In some embodiments, there are red pixels below the receiver electrode Rx_R1, there are green pixels below the receiver electrode Rx_G1, and there are blue pixels below the receiver electrode Rx_B1. There are red pixels below the receiver electrode Rx_R2, there are green pixels below the receiver electrode Rx_G2, and there are blue pixels below the receiver electrode Rx_B2. There are red pixels below the receiver electrode Rx_R3, there are green pixels below the receiver electrode Rx_G3, and there are blue pixels below the receiver electrode Rx_B3, but it is not intended to limit the present disclosure.

Reference is also made to FIG. 3 and FIG. 6, in some embodiments, the period TA includes the period TR, the period TG and the period TB. In the period TR, each of the detection signal ST1, the detection signal ST2 and the detection signals ST3~STm has a pule signals. In the period TG, each of the detection signal ST1, the detection signal ST2 and the detection signals ST3~STm has a pule signals. In the period TB, each of the detection signal ST1, the detection signal ST2 and the detection signals ST3~STm has a pule signals.

And, each of the detection signals ST1~STm in FIG. 3 can respectively correspond to the signals output by the transmitter electrodes Tx[1]~Tx[m] in FIG. 2. The period TG can be later than the period TR, and the period TB can be later than the period TG, but it is not intended to limit the present disclosure.

In some embodiments, in the period TR, each of the second point report subsignal SP2 and the third point report subsignal SP3 has a constant voltage signal. In the period TG, each of the first point report subsignal SP1 and the third point report subsignal SP3 has a constant voltage signal. In the period TB, each of the first point report subsignal SP1 and the second point report subsignal SP2 has a constant voltage signal.

Reference is also made to FIG. 1A, FIG. 1B, FIG. 3 and FIG. 6, in an embodiment, a first time length of the first period is the same as a second time length of the second period. The second time length of the second period is the same as a third time length of a third period. In this embodiment, the first time length, the second time length and the third time length are associated with a screen refresh time of the panel 100. For example, the operation of the display driving method 600 is similar to the operation of the display driving device 10 in FIG. 1A, and the description of the other operation of the display driving method 600 is omitted here to simplify the content of the disclosure.

Reference is also made to FIG. 1A, FIG. 4 and FIG. 6, in some embodiments, the panel 100B includes n groups of receiver electrodes and m transmitter electrodes. The n groups of receiver electrodes includes n receiver electrodes Rx_R[1]~Rx_R[n], n receiver electrodes Rx_G[1]~Rx_G[n] and n receiver electrodes Rx_B[1]~Rx_B[n]. The m transmitter electrode includes a transmitter electrode Tx[1] and the transmitter electrodes Tx[2]~Tx[m]. For example, the operation of the display driving method 600 is similar to the operation of the display driving device 10 in FIG. 1A, and the description of the other operation of the display driving method 600 is omitted here to simplify the content of the disclosure.

Reference is also made to FIG. 1A, FIG. 5 and FIG. 6, in some embodiments, the panel 90 includes a substrate 91, a pixel circuit 92, an isolation layer 93, a transmitter electrode 94, an isolation layer 95, a receiver electrode 96, a protection layer 97, a light emitting diode D1. For example, the operation of the display driving method 600 is similar to the operation of the display driving device 10 in FIG. 1A, and the description of the other operation of the display driving method 600 is omitted here to simplify the content of the disclosure.

In some embodiments, compare to the usual techniques about detection signals detected by the touch electrodes, the display driving method 600 of the present disclosure can achieve that the period of the display operation can overlap the period of the touch period, such as, within a specified period of time, the panel can simultaneously perform the display operation and the touch operation, but it is not intended to limit the present disclosure.

It can be understood from the above embodiments of the present disclosure that the present disclosure has the following advantages. The display driving device and the display driving method of the present disclosure are able to achieve the affect that the display operation and the touch operation can be simultaneously performed by differentiating the panel into the output region and multiple receiver regions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display driving device, comprising:

a panel, comprising:

an output region, configured to output a detection signal;

a first region;

a second region; and a third region, wherein the first region overlaps the output region, wherein the second region overlaps the output region, and wherein the third region overlaps the output region, wherein in a first period, the second region and the third region output a point report signal according the detection signal while the first region is incapable of outputting any point report signal according the detection signal;

wherein in a second period, the first region and the third region output the point report signal according the detection signal while the second region is incapable of outputting any point report signal according the detection signal;

wherein in a third period, the first region and the second region output the point report signal according the detection signal while the third region is incapable of outputting any point report signal according the detection signal;

wherein the second period is later than the first period, and wherein the third period is later than the second period;

wherein the panel is configured to output a red signal, a green signal and a blue signal in sequence; and wherein in the first period, the first region outputs the red signal.

2. The display driving device of claim 1, wherein in the second period, the second region outputs the green signal; and wherein in the third period, the third region outputs the blue signal.

3. The display driving device of claim 1, wherein the first region comprises:

a first receiver sub-region; and a red sub-region, wherein the first receiver sub-region and the red sub-region are overlapped with each other; and wherein in the first period, the red sub-region outputs the red signal.

4. The display driving device of claim 3, wherein the second region comprises:

a second receiver sub-region; and a green sub-region, wherein the second receiver sub-region and the green sub-region are overlapped with each other; and wherein in the second period, the green sub-region outputs the green signal.

5. The display driving device of claim 4, wherein the third region comprises:

a third receiver sub-region; and a blue sub-region, wherein the third receiver sub-region and the blue sub-region are overlapped with each other; and wherein in the third period, the blue sub-region outputs the blue signal.

6. The display driving device of claim 5, wherein the point report signal comprises at least one of a first point report subsignal, a second point report subsignal and a third point report subsignal; and in the first period, the second receiver sub-region outputs the second point report subsignal according to the detection signal, and the third receiver sub-region outputs the detection signal according to the third point report subsignal.

7. The display driving device of claim 6, wherein in the second period, the first receiver sub-region outputs the first point report subsignal according to the detection signal, and the third receiver sub-region outputs the third point report subsignal according to the detection signal.

8. The display driving device of claim 7, wherein in the third period, the first receiver sub-region outputs the first point report subsignal according to the detection signal, and the second receiver sub-region outputs the second point report subsignal according to the detection signal.

9. The display driving device of claim 8, wherein a first time length of the first period is the same as a second time length of the second period;

wherein the second time length of the second period is the same as a third time length of the third period; and wherein the first time length, the second time length and the third time length are associated with a screen refresh time of the panel.

10. A display driving method, comprising:

differentiating a panel into a first region, a second region and a third region;

outputting, by an output region, a detection signal;

outputting, by the panel, a red signal, a green signal and a blue signal;

in a first period, outputting, by the second region and the third region, a point report signal according to the detection signal, and outputting, by the first region, the red signal;

in a second period, outputting, by the first region and the third region, the point report signal according to the detection signal; and in a third period, outputting, by the first region and the second region, the point report signal according to the detection signal, wherein in the first period, the first region is incapable of outputting any point report signal according the detection signal;

wherein in the second period, the second region is incapable of outputting any point report signal according the detection signal;

wherein in the third period, the third region is incapable of outputting any point report signal according the detection signal;

wherein the second period is later than the first period, and wherein the third period is later than the second period; and wherein the first region overlaps the output region, wherein the second region overlaps the output region, and wherein the third region overlaps the output region.

11. The display driving method of claim 10, further comprising:

in the second period, outputting, by the second region, the green signal; and wherein in the third period, outputting, by the third region, the blue signal.

12. The display driving method of claim 10, further comprising:

differentiating the first region into a first receiver sub-region and a red sub-region; and in the first period, outputting, the red sub-region, the red signal, and wherein the first receiver sub-region and the red sub-region are overlapped with each other.

13. The display driving method of claim 12, wherein differentiating the second region into a second receiver sub-region and a green sub-region; and in the second period, outputting, the green sub-region, the green signal, and wherein the second receiver sub-region and the green sub-region are overlapped with each other.

14. The display driving method of claim 13, wherein differentiating the third region into a third receiver sub-region and a blue sub-region; and in the third period, outputting, the blue sub-region, the blue signal, wherein the third receiver sub-region and the blue sub-region are overlapped with each other; and wherein the point report signal comprises at least one of a first point report subsignal, a second point report subsignal and a third point report subsignal.

15. The display driving method of claim 14, wherein in the first period, outputting, by the second receiver sub-region, the second point report subsignal according to the detection signal, and outputting, by the third receiver sub-region, the third point report subsignal according to the detection signal.

16. The display driving method of claim 15, wherein in the second period, outputting, by the first receiver sub-region, the first point report subsignal according to the detection signal, and outputting, by the third receiver sub-region, the third point report subsignal according to the detection signal.

17. The display driving method of claim 16, wherein in the third period, outputting, by the first receiver sub-region, the first point report subsignal according to the detection signal, and outputting, by the second receiver sub-region, the second point report subsignal according to the detection signal.

18. The display driving method of claim 17, wherein a first time length of the first period is the same as a second time length of the second period, wherein the second time length of the second period is the same as a third time length of the third period; and wherein the first time length, the second time length and the third time length are associated with a screen refresh time of the panel.

* * * * *